US008822365B2

(12) United States Patent
Valonen et al.

(10) Patent No.: US 8,822,365 B2
(45) Date of Patent: Sep. 2, 2014

(54) PROCESS FOR THE PREPARATION OF A SOLID METALLOCENE CATALYST SYSTEM AND ITS USE IN POLYMERISATION OF OLEFINS

(75) Inventors: Jenni Valonen, Kerava (FI); Marja Mustonen, Koskenkylän saha (FI)

(73) Assignee: Borealis AG, Vienna (AT)

(*) Notice: Subject to any disclaimer, the term of this patent is extended or adjusted under 35 U.S.C. 154(b) by 0 days.

(21) Appl. No.: 13/643,898

(22) PCT Filed: Apr. 28, 2011

(86) PCT No.: PCT/EP2011/056700
§ 371 (c)(1),
(2), (4) Date: Oct. 26, 2012

(87) PCT Pub. No.: WO2011/138211
PCT Pub. Date: Nov. 10, 2011

(65) Prior Publication Data
US 2013/0045862 A1    Feb. 21, 2013

(30) Foreign Application Priority Data

May 7, 2010    (EP) .................................... 10162260

(51) Int. Cl.
*C08F 4/642*    (2006.01)
*C08F 4/6592*    (2006.01)

(52) U.S. Cl.
USPC ........... 502/107; 502/103; 502/104; 502/152; 526/160; 526/165; 526/348; 526/943

(58) Field of Classification Search
USPC .......... 502/103, 104, 107, 152; 526/123, 160, 526/165, 943, 348
See application file for complete search history.

(56) References Cited

U.S. PATENT DOCUMENTS 5,922,631 A    7/1999    Sangokoya

FOREIGN PATENT DOCUMENTS

| EP | 2186832 A1 | 5/2010 |
| WO | 2007058247 A1 | 5/2007 |

OTHER PUBLICATIONS

International Search Report and Written Opinion for International Application No. PCT/EP2011/056700 Filed on Apr. 28, 2011.

John R. Severn, John C. Chadwick, Robbert Duchateau & Nic Friederichs, "Bound but Not Gagged"—Immobilizing Single-Site Alpha-Olefin Polymerization Catalysts, Chemical Review, 2005, pp. 4073-4147, American Chemical Society.

George J. P. Britovsek, Vernon C. Gibson & Duncan F. Wass, The Search for New-Generation Olefin Polymerization Catalysts: Life beyond Metallocenes, Angew. Chem. Int. Ed., 1999, pp. 428-447, vol. 38, Wiley-VCH Verlag GmbH, Winheim.

John D. Holbrey, W. Matthew Reichert, Mark Nieuwenhuyzen, Oonagh Sheppard, Christopher Hardacre & Robin D. Rogers, Liquid clathrate formation in ionic liquid-aromatic mixtures, Chem. Comm., 2003, pp. 476-477, The Royal Society of Chemistry.

Scott K. Spear, John D. Holbrey & Robin D. Rogers, Liquid Clathrates, Encyclopedia of Supramolecular Chemistry, 2001, pp. 804-807, The University of Alabama, Tuscaloosa, Alabama.

Jerry L. Atwood, Anionic and Cationic Organoaluminum Compounds, Department of Chemistry, The University of Alabama, Tuscaloosa, Alabama, 1993, pp. 197-232.

*Primary Examiner* — Caixia Lu
(74) *Attorney, Agent, or Firm* — Warn Partners, P.C.

(57) ABSTRACT

Process for the preparation of a solid olefin polymerization catalyst system, comprising an organometallic compound of a transition metal of Group 3 to 10 of the Periodic Table (IUPAC 2007) in the form of solid particles comprising the steps of I) generating an emulsion by dispersing a liquid clathrate in a solvent (S) wherein (i) the solvent (S) constitutes the continuous phase of the emulsion and comprises a nonreactive fluorinated synthetic oil having a viscosity at 20° C. according to ASTM D445 of at least 10 cSt up to 2000 cSt (ii) the liquid clathrate constitutes in form of droplets the dispersed phase of the emulsion, II) solidifying said dispersed phase to convert said droplets to solid particles and III) optionally recovering said particles to obtain said catalyst system, wherein the liquid clathrate comprises (a) a lattice being the reaction product of a1) a transition metal compound of formula (I) $L_mR_nTX_q$ wherein "T" is a transition metal of anyone of the groups 3 to 10 of the periodic table (IUPAC2007), preferably a transition metal of anyone of the groups 4 to 6 of the periodic table (IUPAC2007), more preferably titanium (Ti), zirconium (Zr) or hafnium (Hf), i.e. zirconium (Zr) or hafnium (Hf), each "X" is independently a monovalent s-ligand, each "L" is independently an organic ligand which coordinates to the transition metal (T), "R" is a bridging group linking said organic ligands (L), "m" is 2 or 3, preferably 2, "n" is 0, 1 or 2, preferably 1, "q" is 1, 2 or 3, preferably 2, m+q is equal to the valency of the transition metal (T), a2) a cocatalyst comprising aluminoxane a3) a compound being effective to form the lattice with the transition metal compound and/or the aluminoxane and b) a hydrocarbon solvent (HS).

20 Claims, 2 Drawing Sheets

Figure 1: Example 3
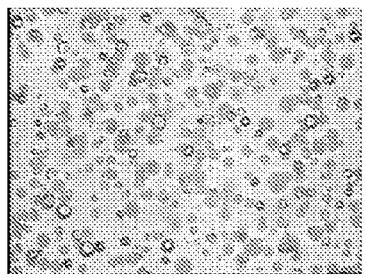
Light microscope photos (x40) of clathrated catalyst in Krytox oil
Figure 2: Example 3
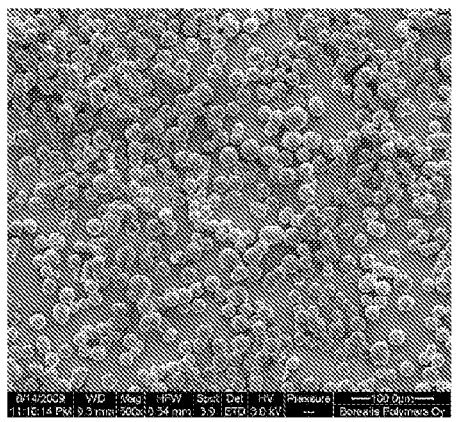
SEM images (x500) of clathrated SSPP catalyst
Figure 3: Example 4
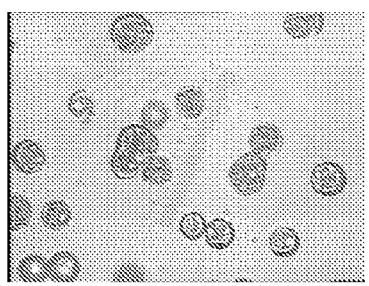
Light microscope photos (x40) of clathrated catalyst in Krytox oil

Figure 4: Example 4
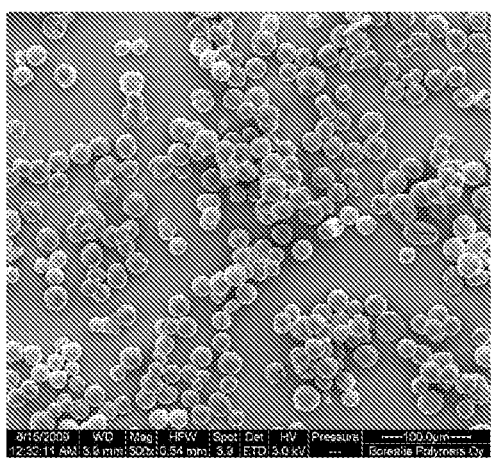
SEM images (x500) of clathrated SSPP catalyst

PROCESS FOR THE PREPARATION OF A SOLID METALLOCENE CATALYST SYSTEM AND ITS USE IN POLYMERISATION OF OLEFINS

CROSS REFERENCE TO RELATED APPLICATIONS

This application is a National Stage of International Application No. PCT/EP2011/056700, filed Apr. 28, 2011. This application claims priority to European Patent Application No. 10162260.3 filed on May 7, 2010. The disclosures of the above applications are incorporated herein by reference.

This invention relates to an improved process for the preparation of a solid metallocene catalyst system with emulsion/solidification technology and to the use of the catalyst system in olefin polymerisation.

In particular, the invention describes the preparation of a solid metallocene catalyst system with emulsion/solidification technology wherein a liquid clathrate constitutes the dispersed phase of the emulsion and a nonreactive fluorinated synthetic oil having a viscosity at 20° C. according to ASTM D445 of at least 10 cSt is used as continuous phase.

BACKGROUND ART

Many catalysts and processes are known for the preparation of olefin polymers. Ziegler-Natta (ZN) catalyst compositions and chromium oxide compounds have, for example, been found to be useful in the preparation of polyolefins.

Further the use of metallocene catalysts in olefin polymerisation has been known for many years and has been found to afford polymer properties not easily available by using ZN-catalysts. Metallocene compounds/procatalysts are conventionally activated using a cocatalyst such as an aluminoxane known from the literature to form the active metallocene catalyst species.

The first single-site catalysts to be developed were homogeneous, i.e. they were used in solution in the polymerisation reaction. Due to the many drawbacks of homogeneous solution systems, several different approaches have been used to try to overcome the problems of the solution catalyst systems. Nowadays the widely used catalyst systems comprise heterogeneous catalysts, wherein catalyst components are supported on an external carrier. Such catalyst systems are described for example by Severn et al., Chem. Rev. 2005; 105(11); 4073-4147 or in the Handbook Tailor-Made Polymers: Via Immobilization of Alpha-Olefin Polymerisation Catalysts of Severn et al.

The carriers used have a porous structure in order to facilitate catalyst impregnation of the support. Carrier materials are typically polymeric or inorganic supports, most typically silica, alumina or magnesium dichloride based materials.

However, the use of an external support involves additional costs, the quality of the support must be carefully controlled and polymers made using supported catalysts can contain carrier residues which cause some problems.

For example, in film applications this is an important feature, since for polymers made by using such supported catalysts, the carrier residues may be visible in the film.

In recent years solid metallocene catalyst systems, providing the advantages of both homogenous and heterogeneous catalysts, were developed by using an emulsion/solidification technology for their preparation without using an external carrier, as for example disclosed in WO 03/051934. Such catalyst systems are further featured by spherical particles with low porosity.

The preparation of this kind of catalyst systems by using an emulsion/solidification technology is based on a liquid/liquid emulsion system comprising at least two phases, whereby the catalyst particles are separated out of the dispersed phase of the emulsion via solidification.

As is disclosed in WO 03/051934 such a process comprises the formation of an emulsion, wherein the continuous phase, in which a solution of the catalyst components forms the dispersed phase in the form of droplets, is immiscible with said catalyst component solution and is selected from halogenated organic solvents, and subsequent solidification of said droplets, comprising the catalyst components, dispersed in a continuous phase of the formed emulsion.

According to the description of WO 03/051934 the continuous phase preferably comprises a halogenated organic solvent, particularly a fluorinated organic solvent and/or a functionalized derivative thereof, still more preferably the solvent comprises a semi-, highly- or perfluorinated hydrocarbon and/or a functionalized derivative thereof.

It is in particular preferred, that said solvent comprises, preferably consists of, a perfluorohydrocarbon or a functionalized derivative thereof, preferably $C_3$-$C_{30}$-perfluoroalkanes, -alkenes or -cycloalkanes, more preferred $C_4$-$C_{10}$-perfluoroalkanes, -alkenes or -cycloalkanes, particularly preferred perfluorohexane, perfluoroheptane, perfluorooctane or perfluoro (dimethylcyclohexane) or a mixture thereof.

According to the method described such catalyst systems are prepared by emulsifying the catalyst solution into cold fluorous hydrocarbons, like perfluorooctane (PFO) or perfluoro-1,3-dimethylcyclohexane (PFC) and then solidifying the droplets by mixing the emulsion with hot PFO or PFC. Solidified particles are then separated from PFO or PFC and dried with inert gas flow. As PFO and PFC are very easily evaporated some of the solvent might be lost in this process, and in handling point of view are demanding chemicals. Furthermore PFO and PFC are quite expensive solvents so it is not desired to lose any of it during the process.

In addition, in order to obtain such an emulsion, and especially also to preserve the droplet morphology during the solidification step, the use of a surfactant is essential.

According to the description of WO 03/051934 the surfactant is preferably based on hydrocarbons (including polymeric hydrocarbons with a molecular weight e.g. up to 10 000) optionally interrupted with (a) heteroatom(s), preferably halogenated hydrocarbons optionally having a functional group, preferably semi-, highly- or perfluorinated hydrocarbons as known in the art.

Alternatively and as shown in cited prior art documents, the surfactant is prepared in-situ by reacting a surfactant precursor with a compound of the catalyst solution. Said surfactant precursor may be a halogenated hydrocarbon with at least one functional group, e.g. a highly fluorinated $C_1$ to $C_{30}$ alcohol having at least one functional group selected from —OH, —SH, —NH$_2$, —COOH, —COONH$_2$, oxides of alkenes, oxo-groups and/or any reactive derivative of these groups, which reacts e.g. with a cocatalyst component, such as aluminoxane.

The use of surfactants improves essentially the preparation process and has clear benefit for the catalyst morphology. However, in some cases surfactants might be not effective enough in stabilizing the emulsion and consequently the morphology is not preserved on the desired level. In addition controlling of the processes for in-situ formation of the surfactant might be demanding due to the many factors effecting the final result.

In addition, the use of such highly reactive fluorinated compounds is considered problematic from HS&E (Health, Safety & Environment) point of view, so that the availability of these compounds in the future is not guaranteed.

Many prior art catalyst systems have the drawback that they tend to dissolve to some extent in the polymerisation medium needed in the slurry reactors and thus the morphology of the catalyst systems is reduced, which in turn cause fouling and sheeting in the reactors.

To solve the above mentioned disadvantages of solubility of the catalyst systems highly controlled catalyst pre-polymerisation as part of the catalyst preparation are suggested in the state of the art. In addition to being a sensitive step, prepolymerisation increases costs on a commercial scale.

Thus there is a strong need to develop improved methods for preparing solid metallocene catalyst systems, however without any external support, with the emulsion/solidification technology using more sustainable materials in environmental, safety and healthy point of view, which overcome the problems of the catalyst systems according to the state of the art.

It was therefore an object of the invention to provide an improved and suitable process for preparing solid metallocene catalyst systems with the emulsion/solidification technology, without the need of external support materials, which catalysts render possible to produce polymers in an efficient manner, i.e. using solid catalyst systems which are less soluble in the polymerisation media and are obtained by a preparation process in which environmentally more friendly, respectively safer materials can been used. A further object is that the obtained catalyst system enables to produce high bulk density polymers with narrow particle size distribution in an efficient manner.

The finding of the present invention is that the solid catalyst system must be produced based on emulsion/solidification technology in which a liquid clathrate constitutes the dispersed phase of the emulsion and the solvent used for the continuous phase of the emulsion is a nonreactive fluorinated synthetic oil having a viscosity at 20° C. according to ASTM D445 of at least 10 cSt. It is a particular finding of the present invention that the use of a non-reactive fluorinated synthetic oil as the continuous phase avoids the addition of a separate surfactant and enables to produce solid catalyst systems with a very narrow particle size distribution.

Thus the present invention is therefore directed to a process for the preparation of a solid olefin polymerisation catalyst system, comprising an organometallic compound of a transition metal of Group 3 to 10 of the Periodic Table (IUPAC 2007) in the form of solid particles comprising the steps of I) generating an emulsion by dispersing a liquid clathrate in a solvent (S)
  wherein
  (i) the solvent (S) constitutes the continuous phase of the emulsion and comprises a nonreactive fluorinated synthetic oil having a viscosity at 20° C. according to ASTM D445 of at least 10 cSt up to 2000 cSt
  (ii) the liquid clathrate constitutes in form of droplets the dispersed phase of the emulsion,
II) solidifying said dispersed phase to convert said droplets to solid particles and
III) optionally recovering said particles to obtain said catalyst system,
wherein the liquid clathrate comprises
  (a) a lattice being the reaction product of
    a$_1$) a transition metal compound of formula (I)

$$L_m R_n T X_q \qquad (I)$$

wherein
  "T" is a transition metal of anyone of the groups 3 to 10 of the periodic table (IUPAC 2007), preferably a transition metal of anyone of the groups 4 to 6 of the periodic table (IUPAC 2007), more preferably titanium (Ti), zirconium (Zr) or hafnium (Hf), i.e. zirconium (Zr) or hafnium (Hf),
  each "X" is independently a monovalent σ-ligand,
  each "L" is independently an organic ligand which coordinates to the transition metal (T),
  "R" is a bridging group linking said organic ligands (L),
  "m" is 2 or 3, preferably 2,
  "n" is 0, 1 or 2, preferably 1,
  "q" is 1, 2 or 3, preferably 2,
  m+q is equal to the valency of the transition metal (T),
  a$_2$) a cocatalyst comprising aluminoxane
  a$_3$) a compound being effective to form the lattice with the transition metal compound and/or the aluminoxane and
b) a hydrocarbon solvent (HS).

Thus, an additional object of the invention is the use of solvent (S) as defined here below in the formation and stabilisation of the emulsion used in the catalyst system preparation in combination with liquid clathrates.

It is especially notable that the specific selected solvents (S) used in the preparation of the catalyst system according to the present invention, are e.g. in HS&E point of view, more convenient materials.

In addition it should be noted that the specific solvent (S) used according to the present invention is not volatile, which makes it much easier and safer to handle.

A further finding of the present invention is that very stable emulsions are formed without the need of adding a separate surfactant and that spherical catalyst particles showing a narrow particle size distribution can be produced.

As an additional advantage it can be mentioned that the process according to the present invention can be carried out in a simplified way, e.g. in only one vessel and with a simplified solidification step, as disclosed in more detail below.

Therefore, the present inventive preparation method represents an economically more attractive alternative for the preparation of such kind of catalyst systems as described here.

BRIEF DESCRIPTION OF THE SEVERAL VIEWS OF THE DRAWINGS

The present invention will become more fully understood from the detailed description and the accompanying drawings, wherein:

FIG. 1 is a light microscope photographic image of perfect spherical particles with small particle size formed in Example 3, illustrating clathrated catalyst in Krytox oil;

FIG. 2 is a scanning electron microscope photographic image of perfect spherical particles with small particle size formed in Example 3, illustrating clathrated SSPP catalyst;

FIG. 3 is a light microscope photographic image of spherical particles with small particle size formed in Example 4, illustrating clathrated catalyst in Krytox oil; and FIG. 4 is a scanning electron microscope photographic image of spherical particles with small particle size formed in Example 4, illustrating clathrated SSPP catalyst.

In the following the essential features of the present invention are described in more detail.

The term "solution" throughout the present application indicates that two or more substances are homogenously mixed. At least one of the substances is a solvent in which the other substances (the solutes) are dissolved.

An "emulsion" according to this invention is a mixture of two liquid substances. One substance (the dispersed phase) is dispersed in the other (the continuous phase) as droplets. In the present application the continuous phase is the solvent (S) and the dispersed phase (in the form of droplets) is the liquid clathrate containing the catalyst components.

The term "liquid" according to this invention indicates that a compound (including a liquid) is liquid by normal pressure (1 atm) at ambient temperature (room temperature, i.e. 20-25° C.).

A "liquid clathrate" is according to this invention a liquid which comprises, preferably consists of, a lattice and a hydrocarbon solvent (HS) as guest enclosed therein. Liquid clathrates are well known and for instance described by Atwood, Jerry L. Dep. Chem., Univ. Alabama, Tuscaloosa, Ala., USA. Editor(s): Robinson, Gregory Heagward; Coord. Chem. Alum. (1993), p. 197-32. Publisher: VCH, New York, N.Y. CODEN: 59ECAI Conference; General Review written in English. CAN 119:117290; John D. Holbrey, "Liquid clathrate formation in ionic liquid-aromatic mixtures", Chem. Commun., 2003, pages 476 to 477, and Scott K. Spear, Encyclopedia of Supramolecular Chemistry, 2001, pages 804 to 807. Accordingly the "liquid clathrate" is a liquid in which the lattice constitutes the superstructure wherein the guest, i.e. the hydrocarbon solvent (HS), is embedded. Preferably the guest stabilizes said superstructure.

An additional benefit of using the clathrated catalysts of the present invention over the known metallocene/MAO based catalysts is the low solubility into solvents including solvents used in polymerisation, which forms an essential benefit of the present invention. One finding of the present invention is that the liquid clathrate is more stable than traditional catalyst/co-catalyst structures and thus is less soluble in preferred media for solidification. This improved stability opens new ways for converting catalyst systems based on transition metal compounds in liquid form into solid catalyst systems.

Thus one essential aspect of the invention is that the solid catalyst is obtained by the use of a specific liquid clathrate.

Accordingly the liquid clathrate of the present invention comprises
(a) a lattice being the reaction product of
  $a_1$) a transition metal compound of formula (I)

$$L_m R_n T X_q \quad (I)$$

wherein
    "T" is a transition metal of anyone of the groups 3 to 10 of the periodic table (IUPAC 2007), preferably a transition metal of anyone of the groups 4 to 6 of the periodic table (IUPAC 2007), more preferably titanium (Ti), zirconium (Zr) or hafnium (Hf), i.e. zirconium (Zr) or hafnium (Hf),
    each "X" is independently a monovalent σ-ligand,
    each "L" is independently an organic ligand which coordinates to the transition metal (T),
    "R" is a bridging group linking said organic ligands (L),
    "m" is 2 or 3, preferably 2,
    "n" is 0, 1 or 2, preferably 1,
    "q" is 1, 2 or 3, preferably 2,
    m+q is equal to the valency of the transition metal (T),
  $a_2$) a cocatalyst comprising aluminoxane
  $a_3$) a compound being effective to form the lattice with the transition metal compound and/or the aluminoxane and
b) a hydrocarbon solvent (HS).

Preferably the lattice is formed by reacting the compound ($a_3$) with the aluminoxane ($a_2$) and/or the transition metal compound ($a_1$) in a hydrocarbon solvent (HS). Thus in the following the individual reactants are defined in more detail.

As stated above for the formation of the lattice of the liquid clathrate a compound ($a_3$) is necessary which reacts with the aluminoxane ($a_2$) and/or the transition metal compound ($a_1$). Preferably the compound ($a_3$) is an M-X compound, an organo-silicon compound or a halo-siloxane compound.

M-X compounds which are effective in forming clathrates with the aluminoxane are organic, inorganic or organometallic compounds which can potentially dissociate or partially dissociate into cationic ($M^+$) and anionic components (X'). Such compounds are disclosed for example in WO 97/14700.

M can be an alkali or alkaline earth metal, like Na, K, Li, Mg or Ca.

X can be a halide, like F, Cl or Br, a pseudohalide or an anionic hydrocarbon group, like an allylic or a benzylic hydrocarbon group.

The term pseudohalide refers to moieties which are not halides but are generally considered to be a good leaving group in substitution reaction. Pseudohalides can include, for example, azides, cyanide, cyanate, thiocyanate, isocyanate, isothiocyanate, silicon groups, sulfur groups, nitrogen groups, oxygen groups, boron groups and phosphorous groups.

Non-limiting examples are alkali and alkaline earth halides or pseudo-halides such as KCl, KF, LiCl, CaCl$_2$, MgCl$_2$, MgF$_2$, NaF, KOSiR$_3$, NaBO$_4$. R being a $C_1$-$C_6$-alkyl residue or KR', wherein R' is an allylic hydrocarbon group or a benzylic hydrocarbon group.

The reaction of such M-X compounds with the aluminoxane and/or the transition metal compound, preferably in a liquid hydrocarbon solvent (HS) as defined in detail below, leads to the formation of the lattice of the liquid clathrate.

Other examples of M-X compounds include metal hydrides such as KH, LiH and alkyl, aryl and alkyl-aryl ammonium, phosphonium, sulfonium and other organometallic salts of halides and pseudo halides such as R$_4$NCl, MePh$_3$PBr, NaBPh$_4$, KB(C$_6$F$_5$)$_4$, LiR$_4$Al, which will effectuate clathrate formation by their reactions with aluminoxane in hydrocarbon solvents. R$_4$ being a $C_1$-$C_8$-alkyl residue.

Preferably used M-X compounds are KCl, KF, NaF, LiCl, CaCl$_2$, MgCl$_2$, MgF$_2$, KH, LiH, KOSiR$_3$, NaBPh$_4$, K$^+$CH$_2$Ph$^-$, Me$_4$NCl, (Octyl)$_3$NClMe, MePh$_3$PBr and KB(C$_6$F$_5$)$_4$.

More preferably used M-X compounds are KCl, KF, NaF, Me$_4$NCl, (Octyl)$_3$NClMe, KH, MePh$_3$PBr, NaBPh$_4$, K$^+$CH$_2$Ph$^-$ and KOSiMe$_3$.

The molar ratio of aluminium, provided by the aluminoxane, and M (cationic moiety), provided by the M-X compound is in the range of 1:1 to 50:1, preferably from 5:1 to 30:1 and more preferably from 8:1 to 25:1.

Organosilicon compounds which are effective in forming the lattice with the aluminoxane ($a_3$) and/or the transition metal compound can be selected from the group of hydrocarbyloxysilanes of the formula R$_3$Si—O[—SiR$_2$—O]$_n$—SiR$_3$  or Si—[O—R] where R is, independently, a hydrocarbyl group having up to about 18 carbon atoms (e.g., linear or branched alkyl, cycloalkyl, aryl, aralkyl) and n is 0 to 3; and hydrocarbylpolysiloxanes having from 2 to 6 silicon atoms in the molecule and which are separated from each other by an oxygen atom such that there is a linear, branched or cyclic backbone of alternating Si and oxygen atoms, with the remainder of the four valence bonds of each of the silicon atoms individually satisfied by a univalent hydrocarbyl group, R, as just defined. Preferred hydrocarbyl groups, R, are methyl, ethyl and phenyl. Examples of such organosilicon compounds include tetramethoxysilane, tetraethoxysilane, tetraphenoxysilane, methoxytrimethylsilane, ethoxytrimethylsilane, hexamethyldisiloxane, hexaethyldisiloxane, hexaphenyldisiloxane, tetramethyldiphenyl-disiloxane, dimethyltetraphenyldisiloxane, hexamethylcyclotrisiloxane, octamethylcyclo-tetrasiloxane, octaphenylcyclotetrasiloxane, octamethyltrisiloxane, decamethyltetrasiloxane, dodecamethylpentasiloxane and tetradecamethylhexasiloxane.

Preferred organosilicon compounds are octamethyltrisiloxane, decamethyltetrasiloxane, octamethylcyclotetrasiloxane, methoxytrimethylsilane and tetraethoxysilane.

The molar ratio of aluminium, provided by the aluminoxane, and the organosilicon compound is in the range of 1:1 to 200:1, preferably from 100:1 to 5:1 and more preferably from 50:1 to 10:1.

Suitable halo-siloxane compounds which are effective in forming the lattice with the aluminoxane ($a_3$) and/or the transition metal compound are siloxanes having hydrocarbyl groups which can contain from about 1 to 30 carbon atoms and include linear and/or branched alkyl groups which contain from about 1 to 24 carbon atoms, cycloalkyl groups which contain from about 3 to 24 carbon atoms, and alkylaryl or aryl groups which contain from about 6 to 30 carbon atoms and at least one hydrocarbyl group of the siloxane contains at least one labile halogen atom. The siloxanes are chosen from disiloxanes and linear or cyclic polysiloxanes. The siloxanes contain the Si—O—Si bond and are substantially free of Si—OH bonds. The siloxanes can contain mixed hydrocarbyl groups. The polysiloxanes have a linear, or branched, or cyclic backbone of alternating silicon and oxygen atoms. Such halo-siloxanes are described for example in US 2009/0088541.

Preferably used as compound ($a_3$) are the above described organo-silicon compounds.

The aluminoxane employed can be any conventional aluminoxane as is known in the art. Aluminoxanes are commercially available or can be prepared according to prior art literature for example by the hydrolysis of aluminium alkyls either by direct water addition or by treatment with salt hydrates. There are a variety of methods for preparing aluminoxane and modified aluminoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656 and European publications EP-A-0 561 476, EP-B1-0 279 586 and EP-A-0 594-218, and WO 94/10180, all of which are herein fully incorporated by reference.

Aluminoxanes are also called alumoxanes.

Preferably, $C_1$-$C_{10}$-alkylalumoxanes, particularly methylalumoxane or modified methylalumoxane, isobutylalumoxane, e.g. TIBAO (tetraisobutylalumoxane) or HIBAO (hexaisobutylalumoxane) are used for step a). More preferably methylalumoxane (MAO) is used.

Most preferably MAO commercially available as 5 to 30 wt % solution in toluene is used.

The third compound used for the formation of the lattice is the transition metal compound of formula (I).

In the formula (I) "T" is a transition metal of anyone of the groups 3 to 10 of the periodic table (IUPAC 2007), preferably a transition metal of anyone of the groups 4 to 6 of the periodic table (IUPAC 2007), more preferably titanium (Ti), zirconium (Zr) or hafnium (Hf), i.e. zirconium (Zr) or hafnium (Hf), each "X" is independently a monovalent σ-ligand,
each "L" is independently an organic ligand which coordinates to the transition metal (T),
"R" is a bridging group linking said organic ligands (L),
"m" is 2 or 3, preferably 2,
"n" is 0, 1 or 2, preferably 1,
"q" is 1, 2 or 3, preferably 2,
m+q is equal to the valency of the transition metal (T)

The transition metal compound of formula (I) $L_mR_nTX_q$ includes symmetric compounds as well as asymmetric compounds, where at least two ligands "L" are of different chemical structure.

Each organic ligand (L) is preferably independently
(a) a substituted or unsubstituted cycloalkyldiene, preferably a cycloalkyldiene selected from the group consisting of unsubstituted cyclopentadiene, substituted cyclopentadiene, monofused derivative of a cyclopentadiene, bifused derivative of a cyclopentadiene and multifused derivative of a cyclopentadiene, or
(b) an acyclic $\eta^1$-, an acyclic $\eta^2$-, an acyclic $\eta^3$-, an acyclic $\eta^4$- or an acyclic $\eta^6$-ligand composed of atoms from Groups 13 to 16 of the periodic table (IUPAC 2007), preferably an acyclic $\eta^1$-, an acyclic $\eta^2$-, an acyclic $\eta^3$-, an acyclic $\eta^4$- or an acyclic $\eta^6$-ligand composed of atoms from Groups 13 to 16 of the periodic table (IUPAC 2007) in which the open chain ligand may be fused with one or two, preferably two, aromatic or non-aromatic rings and/or bear further substituents, or
(c) a cyclic σ-, cyclic $\eta^1$-, a cyclic $\eta^2$-, a cyclic $\eta^3$-, a cyclic $\eta^4$- or a acyclic $\eta^6$-, mono-, bi- or multidentate ligand composed of unsubstituted or substituted mono-, bi- or multicyclic ring systems selected from aromatic or non-aromatic or partially saturated ring systems and containing carbon ring atoms.

More preferably at least one of the organic ligands (L) is selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl.

Further in case the organic ligands (L) are substituted it is preferred that at least one organic ligand (L) comprises
(a) one or more residues independently selected from the group consisting of halogen, $C_1$ to $C_{10}$ alkyl, $C_2$ to $C_{20}$ alkenyl, $C_2$ to $C_{20}$ alkinyl, $C_3$ to $C_{12}$ cycloalkyl, $C_6$ to $C_{20}$ aryl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$ heteroaryl and $C_1$ to $C_{20}$ haloalkyl,
or more preferably
(b) one or more residues independently selected from the group consisting of halogen, $C_1$ to $C_{10}$ alkyl, $C_3$ to $C_{12}$ cycloalkyl, $C_6$ to $C_{20}$ aryl, $C_7$ to $C_{20}$-arylalkyl, $C_3$ to $C_{12}$ cycloalkyl which contains 1, 2, 3 or 4 heteroatom(s) in the ring moiety, $C_6$ to $C_{20}$ heteroaryl and $C_1$ to $C_{20}$ haloalkyl.

By "σ-ligand" is meant throughout the invention a group bonded to the transition metal (M) at one or more places via a sigma bond.

Further the ligands (X) are preferably independently selected from the group consisting of hydrogen, halogen, $C_1$ to $C_{20}$ alkyl, $C_1$ to $C_{20}$ alkoxy, $C_2$ to $C_{20}$ alkenyl, $C_2$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl.

Additionally the bridging group (R) may a bridge of 1 to 7 atoms length, preferably with at least one heteroatom. It is in particular appreciated that the bridging group(s) (R) has (have) the formula (II)

$$—Y(R')(R")— \quad (II)$$

wherein
Y is carbon (C), silicon (Si) or germanium (Ge), and
R', R" are independently selected from the group consisting of is $C_1$ to $C_{20}$ alkyl, $C_4$ to $C_{10}$ cycloalkyl, $C_6$ to $C_{12}$ aryl, $C_7$ to $C_{12}$ arylalkyl, or trimethylsilyl.

According to a preferred embodiment said transition metal compound of formula (I) is a group of compounds known as metallocenes. Said metallocenes bear at least one organic ligand, generally 1, 2 or 3, e.g. 1 or 2, which is η-bonded to the metal, e.g. a $η^2$- to $η^6$-ligand, such as a $η^5$-ligand.

Preferably, a metallocene according to this invention is a transition metal of anyone of the groups 4 to 6 of the periodic table (IUPAC 2007), suitably titanocene, zirconocene or hafnocene, which contains at least one $η^5$-ligand, which is an optionally substituted cyclopentadienyl, an optionally substituted indenyl, an optionally substituted tetrahydroindenyl or an optionally substituted fluorenyl. Thus the transition metal compound has preferably the formula (III)

$$(Cp)_2R_nTX_2 \quad (III)$$

wherein
"T" is zirconium (Zr), hafnium (Hf), or titanium (Ti), preferably zirconium (Zr) or hafnium (Hf),
each "X" is independently a monovalent anionic σ-ligand, preferably selected from the group consisting of hydrogen, halogen, $C_1$ to $C_{20}$ alkyl, $C_1$ to $C_{20}$ alkoxy, $C_2$ to $C_{20}$ alkenyl, $C_1$ to $C_{20}$ alkynyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_2$ to $C_{20}$ alkenyl, $C_2$ to $C_{20}$ alkynyl, $C_3$ to $C_{12}$ cycloalkyl or $C_6$ to $C_{20}$ aryl, more preferably each "X" is Cl,
each "Cp" is independently an unsaturated organic cyclic ligand which coordinates to the transition metal (T),
"R" is a bridging group linking two organic ligands (L), preferably the bridging group (R) has the formula (II)
"n" is 0 or 1, preferably 1, and
at least one "Cp"-ligand is selected from the group consisting of unsubstituted cyclopentadienyl, unsubstituted indenyl, unsubstituted tetrahydroindenyl, unsubstituted fluorenyl, substituted cyclopentadienyl, substituted indenyl, substituted tetrahydroindenyl, and substituted fluorenyl, preferably substituted indenyl.

The transition metal compound of formula (III) $(Cp)_2R_nTX_2$ includes symmetric compounds as well as asymmetric compounds, where both Cp-ligands are of different chemical structure.

The substituted Cp-ligand(s) may have one or more substituent(s) being selected form the group consisting of halogen, hydrocarbyl (e.g. linear $C_1$ to $C_{20}$ alkyl, branched $C_3$ to $C_{20}$ alkyl, linear $C_1$ to $C_{20}$ alkenyl, branched $C_4$ to $C_{20}$ alkenyl, $C_2$ to $C_{20}$ alkinyl, $C_3$ to $C_{12}$ cycloalkyl, $C_1$ to $C_{20}$ alkyl substituted $C_5$ to $C_{20}$ cycloalkyl, $C_5$ to $C_{20}$ cycloalkyl substituted $C_1$ to $C_{20}$ alkyl wherein the cycloalkyl residue is substituted by $C_1$ to $C_{20}$ alkyl, $C_6$ to $C_{20}$ aryl, $C_7$ to $C_{20}$ arylalkyl, $C_3$ to $C_{12}$-cycloalkyl which contains 1, 2, 3 or 4 heteroatom(s) in the ring moiety, $C_6$ to $C_{20}$-heteroaryl, $C_1$ to $C_{20}$-haloalkyl, —SiR"$_3$, —SR", —PR"$_2$ or —NR"$_2$, each R" is independently a hydrogen or hydrocarbyl (e.g. $C_1$ to $C_{20}$ alkyl, $C_1$ to $C_{20}$ alkenyl, $C_2$ to $C_{20}$ alkinyl, $C_3$ to $C_{12}$ cycloalkyl, or $C_6$ to $C_{20}$ aryl) or e.g. in case of —NR"$_3$, the two substituents R" can form a ring, e.g. five- or six-membered ring, together with the nitrogen atom wherein they are attached to.

Further "R" of formula (III) is preferably a bridge of 1 to 7 atoms, e.g. a bridge of 1 to 4 C-atoms and 0 to 4 heteroatoms, wherein the heteroatom(s) can be e.g. silicon (Si), germanium (Ge) and/or oxygen (O) atom(s), whereby each of the bridge atoms may bear independently substituents, such as $C_1$ to $C_{20}$-alkyl, tri($C_1$ to $C_{20}$-alkyl)silyl, tri($C_1$ to $C_{20}$-alkyl)siloxy or $C_6$ to $C_{20}$-aryl substituents; or a bridge of 1 to 3, e.g. one or two, hetero atoms, such as silicon (Si), germanium (Ge) and/or oxygen (O) atom(s), e.g. —SiR$^1_2$—, wherein each R$^1$ is independently $C_1$ to $C_{20}$-alkyl, $C_4$ to $C_{10}$ cycloalkyl, $C_6$ to $C_{20}$-aryl or tri($C_1$ to $C_{20}$-alkyl)silyl- residue, such as trimethylsilyl-.

The "Cp"-ligand of formula (III) is preferably cyclopentadienyl, indenyl, tetrahydroindenyl or fluorenyl, optionally substituted as defined above and may further bear a fused ring of 3 to 7 atoms, e.g. 4, 5 or 6, which ring may be aromatic or partially saturated.

In a suitable subgroup of the compounds of formula (III) each "Cp"-ligand independently bears one or more, like 2, substituents selected from $C_1$ to $C_{20}$ alkyl, $C_6$ to $C_{20}$ cycloalkyl substituted $C_1$ to $C_{20}$ alkyl wherein the cycloalkyl residue is substituted by $C_1$ to $C_{20}$ alkyl, $C_6$ to $C_{20}$-aryl, $C_7$ to $C_{20}$-arylalkyl (wherein the aryl ring alone or as a part of a further moiety may further be substituted as indicated above), wherein R" is as indicated above, preferably $C_1$ to $C_{20}$-alkyl,
the ligand "X" is hydrogen (H), halogen, $C_1$ to $C_{20}$-alkyl, $C_1$ to $C_{20}$-alkoxy, $C_6$ to $C_{20}$-aryl, $C_7$ to $C_{20}$-arylalkenyl or —NR"$_2$ as defined above, e.g. —N($C_1$ to $C_{20}$-alkyl)$_2$, and
the bridging group "R" is a methylene, ethylene or a silyl bridge, whereby the silyl can be substituted as defined above, e.g. a dimethylsilyl=, methylphenylsilyl=, methylcylohexylsilyl=, or trimethylsilylmethylsilyl=-bridge.

A specific subgroup includes the well known metallocenes of Zr, Hf and Ti with one or two, e.g. two, organic ligands (L) which may be bridged or unbridged cyclopentadienyl ligands optionally substituted with e.g. siloxy, alkyl and/or aryl as defined above, or with two unbridged or bridged indenyl ligands optionally substituted in any of the ring moieties with e.g. alkyl and/or aryl as defined above, e.g. at 2-, 3-, 4- and/or 7-positions. As specific examples e.g. bis (alkylcyclopentadienyl) Zr (or Ti or Hf) dihalogenides can be mentioned, such as bis-(n-butylcyclopentadienyl)ZrCl$_2$ and bis-(n-butylcyclopentadienyl)HfCl$_2$, see e.g. EP 129 368. One typical metallocene moiety is rac-R$_2$Si(2-Me-4-PhInd)$_2$ZrCl$_2$, wherein each R is independently an linear or cyclic alkyl of 1 to 10 C atoms, and wherein the Ph group can optionally be substituted by an alkyl group of 1 to 10 atoms, as one examples can be mentioned Rac-Me$_2$Si(2-Me-4-PhInd)$_2$ZrCl$_2$ used in polypropylene polymerisation.

Examples of compounds wherein the metal atom bears a-NR"$_2$ ligand are disclosed i.e. in WO 98/56831 and WO 00/34341. The contents of the documents are incorporated herein by reference. Further metallocenes are described e.g. in EP 260 130. As further examples of usable metallocenes may also be found e.g. from WO 97/28170, WO 98/46616, WO 98/49208, WO 99/12981, WO 99/19335, WO 98/56831, WO 00/34341, EP 423 101 and EP 537 130 as well as V. C. Gibson et al., in Angew. Chem. Int. Ed., engl., vol 38, 1999, pp 428-447, the disclosures of which are incorporated herein by reference.

Said transition metal compounds of formula (I) and (III) being of metallocene type and their preparation are well known in the art. Metallocenes as defined in the instant invention are particularly preferred.

Alternatively, in a further subgroup of the metallocene compounds, the transition metal (M) bears a "Cp"-ligand as defined above and additionally a $\eta^1$- or $\eta^2$-ligand, wherein said ligands may or may not be bridged to each other. This subgroup includes so called "scorpionate compounds" (with constrained geometry) in which the transition metal (M) is complexed by a $\eta^5$-ligand bridged to a $\eta^1$- or $\eta^2$-ligand, preferably $\eta^1$- (for example σ-bonded) ligand, e.g. a metal complex of a "Cp"-ligand as defined above, e.g. a cyclopentadienyl group, which bears, via a bridge member, an acyclic or cyclic group containing at least one heteroatom, e.g. —NR''$_2$ as defined above. Such compounds are described e.g. in WO 96/13529, the contents of which are incorporated herein by reference.

Any alkyl, alkenyl or alkynyl residue referred above alone or as a part of a moiety may be linear or branched, and contain preferably of up to 9, e.g. of up to 6, carbon atoms. Aryl is preferably phenyl or naphthalene. Halogen means F, Cl, Br or I, preferably Cl.

Another subgroup of the transition metal compounds of formula (I) usable in the present invention is known as non-metallocenes wherein the transition metal (T) (preferably a Group 4 to 6 transition metal, suitably Ti, Zr or Hf) has a coordination ligand other than cyclopentadienyl ligand.

The term "non-metallocene" used herein means compounds, which bear no cyclopentadienyl ligands or fused derivatives thereof, but one or more non-cyclopentadienyl $\eta$-, or σ-, mono-, bi- or multidentate ligand. Such ligands can be chosen e.g. from (a) acyclic, $\eta^1$- to $\eta^4$- or $\eta^6$-ligands composed of atoms from Groups 13 to 16 of the periodic table (IUPAC 2007), e.g. an acyclic pentadienyl ligand wherein the chain consists of carbon atoms and optionally one or more heteroatoms from groups 13 to 16 (IUPAC 2007), and in which the open chain ligand may be fused with one or two, preferably two, aromatic or non-aromatic rings and/or bear further substituents (see e.g. WO 01/70395, WO 97/10248 and WO 99/41290), or (b) cyclic σ-, $\eta^1$- to $\eta^4$- or $\eta^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from groups 15 and 16 of the periodic table (IUPAC 2007) (see e.g. WO 99/10353).

Bi- or multidentate ring systems include also bridged ring systems wherein each ring is linked via a bridging group, e.g. via an atom from groups 15 or 16 of the periodic table (IUPAC), e.g. N, O or S, to the transition metal (M) (see e.g. WO 02/060963). Such compounds are i.a. transition metal complexes with nitrogen-based, cyclic or acyclic aliphatic or aromatic ligands, e.g. such as those described in WO 99/10353 or in the Review of V. C. Gibson at al., in Angew. Chem. Int. Ed., engl., vol 38, 1999, pp 428-447, or with oxygen-based ligands, such as group 4 metal complexes bearing bidentate cyclic or acyclic aliphatic or aromatic alkoxide ligands, e.g. optionally substituted, bridged bisphenolic ligands (see i.a. the above review of Gibson et al). Further specific examples of non-$\eta^5$-ligands are amides, amide-diphosphane, amidinato, aminopyridinate, benzamidinate, azacycloalkenyl, such as triazabicycloalkenyl, allyl, beta-diketimate and aryloxide. The disclosures of the above documents are incorporated herein by reference.

The preparation of metallocenes and non-metallocenes, and the organic ligands thereof, usable in the invention is well documented in the prior art, and reference is made e.g. to the above cited documents. Some of said compounds are also commercially available. Thus, said transition metal compounds can be prepared according to or analogously to the methods described in the literature, e.g. by first preparing the organic ligand moiety and then metallating said organic ligand ($\eta$-ligand) with a transition metal. Alternatively, a metal ion of an existing metallocene can be exchanged for another metal ion through transmetallation.

If several different transition metal compounds are used (mixed dual or multicatalyst systems), these can be any combinations of the above transition metal compounds of formula (I) or of the above transition metal compounds of formula (I) with other catalyst compounds (including Ziegler-Natta and chromium oxide systems), e.g. a combination at least of two or more a metallocenes, of a metallocene and a non-metallocene, as well as of a metallocene and/or a non-metallocene with a Ziegler-Natta catalyst system (which comprises typically a transition metal compound and a compound of a metal from Group 2 of the Periodic Table, such as a Mg compound).

The molar ratio of aluminium, provided by the aluminoxane (a$_3$), and the transition metal T is in the range of 1 to 10 000, preferably 10 to 7000, e.g. 100 to 4000, such as 100 to 2000, e.g. 100 to 1000. Typically in case of solid (heterogeneous) catalyst the ratio is preferably below 500, like 100 to 400.

The quantity of cocatalyst to be employed in the catalyst of the invention is thus variable, and depends on the conditions and the particular transition metal compound chosen in a manner well known to a person skilled in the art.

The hydrocarbon solvent (HS) can be selected from the group consisting of a linear alkane, cyclic alkane, linear alkene, cyclic alkene, aromatic hydrocarbon and is preferably an aromatic hydrocarbon solvent, such as for example toluene, benzene, xylenes, ethylbenzene, cumene, mesitylene or cymene. More preferably the hydrocarbon solvent (HS) is toluene.

The liquid clathrate is obtainable by, preferably obtained by preparing first an aluminoxane clathrate and react this pre-formed clathrate with the transition metal compound of formula (I) (variant A) or to react first the aluminoxane with the transition metal compound of formula (I) with subsequent clathrate formation (variant B).

Thus in one embodiment (variant A) the liquid clathrate is obtainable by, preferably obtained by, (i) preparing a mixture of the hydrocarbon solvent (HS), the aluminoxane and the clathrate forming compound (a$_3$), (ii) adding to said mixture the transition metal compound of formula (I)

(iii) obtaining a two phase system, the upper phase being a hydrocarbon solvent (HS) rich phase and the lower phase being the liquid clathrate phase, (iv) separating the lower phase being the liquid clathrate phase from upper phase being a hydrocarbon solvent (HS) rich phase.

In another embodiment (variant B) the liquid clathrate is obtainable by, preferably obtained by, (i) preparing a solution of the hydrocarbon solvent (HS), the aluminoxane and the transition metal compound of formula (I)

(ii) adding to said solution the clathrate forming compound (a$_3$)

(iii) obtaining a two phase system, the upper phase being a hydrocarbon solvent (HS) rich phase and the lower phase being the liquid clathrate phase, (iv) separating the lower phase being the liquid clathrate phase from upper phase being the hydrocarbon solvent (HS) rich phase.

Ad Variant A:

According to variant A in step (i) the clathrate forming compound is added to the aluminoxane, in a molar ratio as defined above, in the hydrocarbon solvent.

The starting concentration of aluminoxane in the solvent is not particularly critical and usually ranges from 5 to 30 wt % solution.

As solvent a hydrocarbon solvent as defined above, preferably an aromatic hydrocarbon solvent, such as for example toluene, benzene, xylenes, ethylbenzene, cumene mesitylene or cymene is used. More preferably used is toluene.

The reaction temperature is chosen to provide a clathrate. Such a reaction is characterized by the formation of a two phase system comprising two stable immiscible organic layers, which remain intact such that the upper hydrocarbon solvent layer can be separated from the lower aluminoxane clathrate containing layer.

Although the use of ambient temperatures is most convenient, i.e. from 0 to 30° C., some compounds require elevated temperatures up to 80° C. or higher in order to form a clathrate. Otherwise, some compounds form clathrates at temperatures down to −25° C. An art skilled person can easily determine experimentally a suitable temperature for any of the clathrate forming compounds.

Preferably methylaluminoxane (MAO) is used for variant A. More preferably commercially available solutions of MAO in toluene are employed. Such solutions are available as 5 to 30 wt % solutions in toluene.

Advantageously the MAO clathrate forms the lower clathrate layer and trimethylaluminium (unreacted starting material from the preparation of MAO) is extracted into the toluene rich upper phase, so that the MAO clathrate preferably contains decreased amount of unreacted trimethylaluminium. The amount of alkylaluminium will depend on clathrate used, its content in synthesis and the reaction temperature used. A person skilled in art can optimize the synthesis conditions to achieve an optimized removal of unreacted trimethylaluminium.

For further processing the clathrate containing lower phase is separated from the upper solvent layer by conventional separation techniques, for example by decantation or draining.

Optionally the separated aluminoxane clathrate phase can be washed before further use. Preferably the clathrate phase is washed once or up to 5 times, preferably once to three times, with the solvent used for its preparation. Preferably an aromatic hydrocarbon solvent, more preferably toluene is used for the preparation of the clathrate and for the washing step.

The pre-formed clathrate is then reacted, preferably under stirring, with the organotransition metal compound of formula (I), as described above, under inert atmosphere of for example $N_2$ or Argon at temperatures between 10 and 40° C., preferably between 15 and 35° C. and more preferably between 20 and 30° C., for example at room temperature.

Ad Variant B:

According to variant B the aluminoxane is first reacted with the transition metal compound of formula (I) in a hydrocarbon solvent, as disclosed above. The formed solution is further reacted with the clathrate forming compound leading again to the formation of a two phase system comprising two stable immiscible organic layers, which remain intact such that the upper aromatic solvent layer can be separated from the lower aluminoxane clathrate/transition metal containing layer.

The reaction is again performed preferably under stirring and under inert atmosphere of for example $N_2$ or argon at temperatures between 10 and 40° C., preferably between 15 and 35° C. and more preferably between 20 and 30° C., for example at room temperature.

The upper phase is discarded and the lower phase is optionally washed before further use. The clathrate containing phase can be washed once or up to 5 times, with the solvent used for its preparation. Preferably an aromatic hydrocarbon, more preferably toluene is used for the preparation of the clathrate and for the washing step.

Accordingly the reactions according to Variant (A) and (B) are characterized by the formation of a two phase system comprising two stable immiscible organic layers, which remain intact such that the upper layer (being the hydrocarbon solvent (HS) rich layer) can be separated from the lower liquid clathrate layer, i.e. the liquid clathrate.

For further processing the liquid clathrate phase, i.e. the liquid clathrate, is separated from the upper solvent layer by conventional separation techniques, for example by decantation or draining.

A further finding of the present invention is that solid catalyst particles are obtainable using solvents which are convenient to handle in the process.

Accordingly specific solvent (S) comprising a nonreactive fluorinated synthetic oil having a viscosity at 20° C. according to ASTM D445 of at least 10 cSt are used in the process of the present invention.

Additionally, the combination of the use of a liquid clathrate and the specific solvent (S) enables to produce solid catalyst systems with a very low surface area and a very narrow particle size distribution.

Thus a further important aspect of the present invention is the specific selected solvent (S) which forms with the liquid clathrate the emulsion.

Accordingly the liquid clathrate must be immiscible or only partly miscible (not more than 20 wt. %, preferably not more than 10 wt. %, like not more than 5 wt. % of the liquid clathrate) with the solvent (S) at the conditions (e.g. temperatures) used during the step (I).

Further the solvent (S) must be also inert in relation to the compounds of the solid catalyst system to be produced. The term "inert in relation to the compounds" means herein that the solvent (S) being the continuous phase is chemically inert, i.e. undergoes no chemical reaction with any solid catalyst system forming compound or catalyst system precursor forming compound (e.g. the transition metal compound and the aluminoxane). Thus, the solid particles of the catalyst system or any precursor thereof are formed in the droplets from the compounds which originate from the dispersed phase, i.e. are provided to the emulsion in the liquid clathrate dispersed into the continuous phase forming solvent (S).

The solvent (S) is according to the invention a nonreactive fluorinated synthetic oil having a viscosity at 20° C. according to ASTM D445 of at least 10 cSt.

The fluorinated synthetic oil preferably has a viscosity at 20° C. (according to ASTM D445) of at least 30 cSt, more preferably of at least 100 cSt, even more preferably of at least 300 cSt, still more preferably of at least 400 cSt and most preferably of at least 700 cSt.

The upper limit for the viscosity at 20° C. (according to ASTM D445) of the fluorinated synthetic oil used is preferably 2000 cSt, more preferably 1600 cSt and even more preferably 1000 cSt.

Examples for such fluorinated synthetic oils, but not restricted thereto, are fluorinated polyethers, fluor- and chlorinated polyethylenes, fluorinated silicones and combinations thereof.

Preferably perfluoropolyethers, polytrichlorofluoroethylenes, fluorosilicones, or combinations thereof are used as fluorinated synthetic oil, more preferably a perfluoropolyether is used.

Any perfluoropolyether having a viscosity at 20° C. (according to ASTM D445) of at least 10 cSt up to 2000 cSt, known to one skilled in the art can be used in the invention composition. A common characteristic of perfluoropolyethers suitable for the present invention is the presence of perfluoroalkyl ether moieties. The term "perfluoropolyether" is exchangeable with "PFPE", "PFPE oil", "PFPE fluid", "PFAE" (perfluoroalkylether) or "PFPAE" (perfluoropolyalkylether), as is known to one skilled in the art.

Suitable perfluoropolyethers are for example described in WO 2007/082046, US 2007/049502, U.S. Pat. No. 6,528,457, WO 00/18849, etc.

Preferably said perfluoropolyether is selected from the group of perfluoropolyethers having the formula:

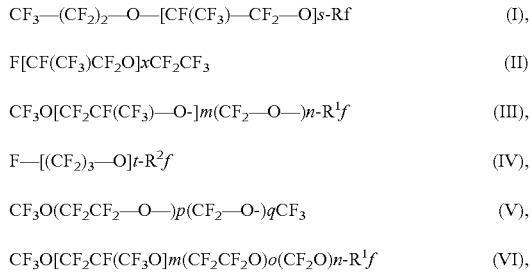

or combinations of two or more thereof; wherein
s is an integer from 2-100; Rf is CF2CF3, a C3 to C6 perfluoroalkyl group, or combinations thereof; x is an integer from 10 to 60; $R^1f$ is CF3, C2F5, C3F7, or combinations of two or more thereof; (m+n) is 8-45, inclusive; (m+n+o) is 8-45, inclusive; m/n is 20-1000, inclusive; o is >1 $R^2f$ is CF3, C2F5, or combinations thereof; t is 2-200, inclusive; (p+q) is 40-180, inclusive; and p/q is 0.5-2, inclusive, provided that the perfluoropolyether has a viscosity at 20° C. (according to ASTM D445) of at least 10 cSt up to 2000 cSt, preferably of at least 30 cSt up to 1600 cSt and more preferably of at least 100 cSt up to 1000 cSt.

More preferably the perfluoropolyether used has the formula (I) CF3—(CF2)2—O—[CF(CF3)—CF2—O]s-Rf or the formula F[CF(CF3)CF2O]xCF2CF3 (II) and a viscosity at 20° C. (according to ASTM D445) of at least 10 cSt up to 2000 cSt, preferably of at least 30 cSt up to 1600 cSt and more preferably of at least 100 cSt up to 1000 cSt.

Most preferably a perfluoropolyether with the formula (II) having a viscosity at 20° C. (according to ASTM D445) of at least 10 cSt up to 2000 cSt, preferably of at least 30 cSt up to 1600 cSt and more preferably of at least 100 cSt up to 1000 cSt is used as solvent (B).

Representative perfluoropolyethers that can be used according to the invention and have one of the above defined formulas (I) to (V) are available on the market under the trade names FOMBLIN® and GALDEN® (from Ausimont, Milan, Italy), KRYTOX® (from E. I. du Pont de Nemours and Company, Wilmington, Del.), and DEMNUM® (from Daikin, Osaka, Japan).

Thus, useful and commercially available oils are perfluoropolyethers sold under the trademark Krytox® by E.I. du Pont de Nemours and Company, and particularly oils of Krytox® GPL or FG (food grade Krytox oils) series, which fulfil the viscosity requirements as indicated above, i.e. having a viscosity at 20° C. (according to ASTM D445) of at least 10 cSt, for example Krytox® GPL 102-107 oils.

Krytox® fluorinated oils are a series of low molecular weight, fluorine end-capped, homopolymers of hexafluoropropylene epoxide. The polymer chain is completely saturated and contains only the elements carbon, oxygen and fluorine; hydrogen is not present. On a weight basis, Krytox® contains 21.6% carbon, 9.4% oxygen and 69.0% fluorine.

It should be noted that all nonreactive fluorinated synthetic oils fulfilling the viscosity and other given requirements for being suitable as solvent (B) of the continuous phase can be used in the preparation method according to the present invention.

Suitable processes for dispersing the liquid clathrate within the solvent (S) to form an emulsion is the use of a mechanical device as well as the use of ultrasound for mixing, as known to the skilled person. The process parameters, such as time of mixing, intensity of mixing, type of mixing, power employed for mixing, such as mixer velocity or wavelength of ultrasound employed, viscosity of solvent phase, are used for adjusting the size of the catalyst system.

In one embodiment the liquid clathrate can be injected under the surface of solvent (S) while mixing and in a further embodiment the liquid clathrate can be injected on top of the surface of solvent (S) before or while mixing.

Regardless of the method used to form the emulsion, its temperature prior to step (II) is preferably −20 to +50° C., more preferably −10 to +40° C., yet more preferably −5 to 30° C., and still more preferably 0 to 20° C. Suitable temperature is dependent on the solvents used.

In step (II) of the process of the invention the catalyst system is solidified from the droplets of the dispersed phase.

According to the present invention the solidification is affected by evaporating the hydrocarbon solvent (HS), preferably toluene with an inert gas, like argon, yielding solid, spherical catalyst particles.

Choosing the parameters, like temperature, inert gas flow and the like for performing the evaporation lies within the common knowledge and skill of art skilled person. The effectiveness of evaporation can be enhanced by increasing the mixing speed, the inert gas flow rate and temperature.

This simplified way of solidification has the advantage that emulsification and solidification can be done in one vessel.

The catalyst system, i.e. the solid, spherical catalyst particles, may then be optionally washed and/or dried to remove any solvent residuals present in the particles. The washing and/or drying of the catalyst particles may be carried out in any manner conventional in the art.

For further details, embodiments and examples of emulsion formation method reference is made e.g. to the international patent application WO 03/051934.

The instant process leads to a solid catalyst system not comprising any external solid carrier material. Such solid catalyst systems are featured by a low surface area and/or porosity. Furthermore the catalyst system prepared with the method according to the present invention has the advantage that it is essentially insoluble in hydrocarbons.

In addition, if organosilicon compounds are used as clathrate forming compound the catalyst systems yielded further show improved productivity compared to catalyst systems prepared by the "classical" emulsion/solidification technology without the formation of a clathrate. And, as a further advantage, the volume yield increases, i.e. with the same reactor volume more catalyst can be produced, which saves a lot of production time and thus improves production economy.

The above defined process leads also to new catalyst system as defined in more detail below.

Accordingly the present invention is also directed to a catalyst system, preferably obtainable, more preferably obtained, by the process as described above, comprising
(a$_1$) a transition metal compound of formula (I)

wherein
"T" is a transition metal of anyone of the groups 3 to 10 of the periodic table (IUPAC 2007),
each "X" is independently a monovalent anionic σ-ligand,
each "L" is independently an organic ligand which coordinates to the transition metal (T),
"R" is a bridging group linking said organic ligands (L),
"m" is 2 or 3, preferably 2,
"n" is 0, 1 or 2, preferably 1,
"q" is 1, 2 or 3, preferably 2,
m+q is equal to the valency of the transition metal (T),
(a$_2$) a cocatalyst comprising aluminoxane and
(a$_3$) a compound being effective to form the lattice with the transition metal compound and/or the aluminoxane,
wherein the catalyst system has a mean particle size of 1 to 100 μm, more preferred of 3 to 60 μm and the most preferably of 5-40 μm measured by image analysis out of light microscope images.

According to the method of the invention it is possible to get catalyst particles with a very small particle size, e.g. a mean particle size of 5 to 40 μm and with a very narrow particle size distribution. Furthermore the obtained particles are very spherical and have a smooth surface.

Preferred transition metal compounds of formula (I) and cocatalysts (Co) are those as defined above.

Additionally, as already mentioned, the inventive catalyst system is featured by the fact that it does not comprise any catalytically inert support material, such as organic and inorganic support materials, like silica, MgCl$_2$ or porous polymeric material. As a consequence that the catalyst system is self-supported it has a rather low surface area as defined in further detail below. Thus, it should be noted that the polymer produced by using the catalyst produced according to the invention does not contain any silica residues.

Further, the catalyst system does not contain any residues of undesired surfactants due to the inventive preparation method avoiding the use of such surfactants.

The obtained catalyst particles have a low surface area and low porosity.

The catalyst particles according to the invention have a compact structure with high bulk density resulting in, due to the replica effect, polymers with high density bulk density.

The present invention is further related to the use of the above defined catalyst system for olefin polymerisation to yield polyolefins and the polyolefins produced with such a catalyst system.

Suitable polyolefins comprise polyethylene and polypropylene homopolymers, and also polyethylene, polypropylene and polypropylene/ethylene copolymers comprising from 0 to 40 wt % of C$_2$-olefin or C$_3$ to C$_{30}$-alpha-olefin or C$_4$ to C$_{30}$-diene-derived units, and more particularly a copolymer or terpolymer of ethylene and/or propylene with 0 to 10 wt % alkenes, for example ethylene, 1-propene, 1-butene, 1-pentene, 4-methyl-pent-1-ene, 1-hexene, cyclohexene, 1-octene and norbornene, or dienes, for example butadiene, hexadiene or octadiene.

In a preferred embodiment the polyolefins produced by using the catalyst according to the invention are propylene polymers.

Depending on polymerisation process configuration the polymers produced can be uni- or multimodal, like bimodal.

In addition, the present invention is related to the process for producing the polyolefins, whereby the catalyst system as defined above is employed.

Any method of olefin polymerisation—for example, a gas phase, slurry phase, solution polymerisation process or any combinations thereof—that is known for the polymerisation of olefins to form polyolefins in combination with the catalysts system of the invention can be used.

Polymerisation can be a one stage or a two or multistage polymerisation process, carried out in at least one polymerisation reactor. Typical polymerisation reactors include slurry and gas phase reactors. Thus polymerisation can be carried out in a combination of at least two reactors, in some cases at least three reactor are used, e.g. gas phase/gas phase, slurry phase/slurry phase, slurry phase/gas phase or slurry phase/gas phase/gas phase processes; slurry phase/gas phase or slurry phase/gas phase/gas phase polymerisation being preferred ones.

In addition to the actual polymerisation the process configuration can comprise any pre- or post reactors.

The catalyst system according to the invention may be introduced into the polymerisation reactor by any suitable means as is known in the art regardless of the type of polymerisation reactor used.

Generally the quantity of catalyst system used will depend upon the nature of the catalyst system, the reactor types and conditions and the properties desired for the polymer product. Conventional catalyst quantities, such as described in the publications referred herein, may be used.

The reactor setup is not particularly limited and can be any reactor setup known to the skilled person.

1. METHODS

The following definitions of terms and determination methods apply for the above general description of the invention as well as to the below examples unless otherwise defined.

Catalyst Activity/Catalyst Productivity

A 5 liter stainless steel reactor was used for propylene polymerisations. 1100 g of liquid propylene (Borealis polymerisation grade) was fed to the reactor. 0.2 ml of triethylaluminum (100%, purchased from Crompton) was fed as a scavenger and 15 mmol hydrogen as chain transfer agent. The reactor temperature was set to 30° C. The catalyst was flushed into to the reactor with nitrogen overpressure. The reactor was heated up to 70° C. in a period of 15 minutes. After polymerisation for 30 minutes the remaining propylene was flushed out and the polymer was dried and weighed.

Polymer yield (based on 30 min polymerisation) is determined. Catalyst activity is polymer yield [kg] divided by catalyst amount [g]. Catalyst productivity is catalyst activity divided by time [hours].

ICP Analysis

The elemental analysis of a catalyst was performed by taking a solid sample of mass, M, cooling over dry ice. Samples were diluted up to a known volume, V, by dissolving in nitric acid (HNO$_3$, 65%, 5% of V) and freshly deionised (DI) water (5% of V). The solution was then added to hydrofluoric acid (HF, 40%, 3% of V), diluted with DI water up to the final volume, V, and left to stabilize for two hours.

The analysis was run at room temperature using a Thermo Elemental IRIS Advantage XUV Inductively Coupled Plasma—Atomic Excitation Spectrometer (ICP-AES) which was calibrated immediately before analysis using a blank (a solution of 5% HNO$_3$, 3% HF in DI water), a low standard (10 ppm Al in a solution of 5% HNO$_3$, 3% HF in DI water), a high standard (50 ppm Al, 50 ppm Hf, 20 ppm Zr in a solution of 5% HNO$_3$, 3% HF in DI water) and a quality control sample (20 ppm Al, 20 ppm Hf, 10 ppm Zr in a solution of 5% HNO$_3$, 3% HF in DI water).

The content hafnium was monitored using the 282.022 nm and 339.980 nm lines and the content for zirconium using 339.198 nm line. The content of aluminium was monitored via the 167.081 nm line, when Al concentration in ICP sample was between 0-10 ppm and via the 396.152 nm line for Al concentrations between 10-100 ppm.

The reported values, required to be between 0 and 100, or further dilution is required, are an average of three successive aliquots taken from the same sample and are related back to the original catalyst using equation 1.

$$C = \frac{R \times V}{M}$$ Equation 1 wherein
C is the concentration in ppm, related to % content by a factor of 10,000
R is the reported value from the ICP-AES
V is the total volume of dilution in ml
M is the original mass of sample in g If dilution was required then this also needs to be taken into account by multiplication of C by the dilution factor PSD (Method 1)

Particle size distribution (PSD) and the average particle sizes were determined by static image analysis. A system comprising of a Zeiss Axioplan light microscope equipped with a Flea2 Digital camera from Point Grey Research Inc., a motorised XY-stage from Märzhäuser with Corvus controller and a PC was used to acquire images of catalyst particles dispersed in oil on glass slides. Calibration of the system was performed with a stage micrometer (2 mm, with 0.01 mm divisions).

A suspension of approximately 2 to 3 wt.-% of the catalyst in oil was prepared for the analysis. After homogenising the suspension three samples were deposited on separate microscope slides and covered with a cover glass. The slides were placed on the microscope stage and a magnification of 10× (numerical aperture 0.30) was chosen to obtain approximately 10 to 20 particles in the measurement frame. Illumination was adjusted to give a light background and the microscope was focused on the sample particles. For each slide approximately 500 images were scanned in a raster pattern and stored. Using image analysis software the images were processed and analysed. For each image the isolated particles which did not overlap the image edges were counted and their area, equivalent circular diameter and other parameters recorded. In total, a minimum of 15 000 particles were counted. For the final results, the particles from all images were grouped in to size classes and presented as a histogram. Size classes were determined by $x_i/x_{i-1} = 1,0977$, where $x_i$ is the upper and $x_{i-1}$ the lower particle size of the ith size class. Particles assigned to a given size class have a diameter that is equal to or greater than $x_{i-1}$ and less than $x_i$.

The particles size distribution, variance of particle size distribution and average particle sizes ($\bar{x}_{1,0}, \bar{x}_{2,0}, \bar{x}_{3,0}, \bar{x}_{1,2}$ and $\bar{x}_{1,3}$) were calculated according to ISO 9276-1:1998(E) and ISO 9276-2:2001(E).

PSD (Method 2):
Particle size distribution measured with scanning electron microscopy (SEM)

Chemicals
MAO was purchased from Albermarle and used as a 30 wt-% solution in toluene.
PFPE Krytox® GPL 106 from E. I. du Pont de Nemours and Company, Wilmington, Del., dried under vacuum for several hours at 100° C. prior to use.
PFPE Krytox® GPL 102 from E. I. du Pont de Nemours and Company, Wilmington, Del. dried under vacuum for several hours at 100° C. prior to use.
rac-cyclohexyl(methyl)silanediyl-bis(2-methyl-4-(4'-tert-butyl-phenyl)inden-1-yl) zirconium dichloride from Boulder Scientific company (CAS Registry Number 888227-55-2)
Octamethyltrisiloxane (OMTS), from Sigma Aldrich Finland Oy (CAS Registry Number 107-51-7)
Propylene was provided by Borealis and adequately purified before use. Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes or needles.

2. PREPARATION OF THE EXAMPLES

Example 1

Preparation of Liquid Clathrate; Variant B

A catalyst solution was formed by reaction of 250 mg of rac-cyclohexyl(methyl)silanediyl-bis(2-methyl-4-(4'-tert-butyl-phenyl)inden-1-yl) zirconium dichloride and 15 mL of a 30 wt % MAO solution in toluene by mixing the complex and MAO at room temperature for 0.5 h. Al/Zr was 370 mol/mol.

0.97 mL of clathrating agent octamethyltrisiloxane (OMTS) was added into this solution and the so obtained solution was left into a glovebox overnight while mixing. Red mixture turned into orange after OMTS addition. The following day mixing was stopped and the liquid separated into toluene phase and catalyst phase. 5 mL of the bottom catalyst phase was used. Now the liquid had changed its colour into dark red and also top phase had reddish colour.

Example 2

Preparation of Liquid Clathrate; Variant A 0.97 mL of clathrating agent octamethyltrisiloxane (OMTS) was added to 15 mL of a 30 wt % MAO solution in toluene and the resultant slurry was stirred over night. Stirring was then stopped and two separate phases were formed. The upper phase was discarded.

5 mL of the lower phase containing the clatherated MAO were added to 179 mg of rac-cyclohexyl(methyl)silanediyl-bis(2-methyl-4-(4'-tert-butyl-phenyl)inden-1-yl) zirconium dichloride. The resultant solution was stirred for 1 hour and had a dark red colour. Al/Zr was 235 mol/mol Example 3

5 mL of a catalyst solution prepared according to Example 1 where added 30 mL of Krytox GPL 106 into a 50 mL emulsification glass reactor equipped with "open baffles" and an overhead stirrer below the surface of the oil. Then mixing started for 15 min with a tip speed of 0.75 m/s (mixing speed 250 rpm).

Afterwards toluene evaporation with argon started. Argon flushing was continued for 120 min before mixing was stopped and the remaining catalyst/oil slurry was siphoned into a septa bottle.

Catalyst:

PSD: 5-15 μm (based on SEM images)

The catalyst productivity was 5 kg PP/gcat·h.

Perfect spherical particles with small particle size were formed as can be seen from FIG. 1 and FIG. 2.

Example 4

5 mL of a catalyst solution prepared according to Example 2 where added to 30 mL of Krytox GPL 106 into a 50 mL emulsification glass reactor equipped with "open baffles" and an overhead stirrer below the surface of the oil. Then mixing started for 15 min with a tip speed of 0.75 m/s (mixing speed 250 rpm).

Afterwards toluene evaporation with argon started. Argon flushing was continued for 120 min before mixing was stopped and the remaining catalyst/oil slurry was siphoned into a septa bottle.

Catalyst:

PSD: 20-30 μm (based on SEM images)

The catalyst productivity was 5 kg PP/gcat·h.

Spherical particles with small particle size were formed as can be seen from FIG. 3 and FIG. 4.

We claim:

1. A process for the preparation of a solid olefin polymerisation catalyst system, comprising an organometallic compound of a transition metal of Group 3 to 10 of the Periodic Table (IUPAC 2007) in the form of solid particles comprising the steps of I) generating an emulsion by dispersing a liquid clathrate in a solvent (S)
wherein
(i) the solvent (S) constitutes the continuous phase of the emulsion and comprises a nonreactive fluorinated synthetic oil having a viscosity at 20° C. according to ASTM D445 of at least 10 cSt up to 2000 cSt
(ii) the liquid clathrate constitutes in form of droplets the dispersed phase of the emulsion, II) solidifying said dispersed phase to convert said droplets to solid particles, and III) optionally recovering said particles to obtain said catalyst system, wherein the liquid clathrate comprises
(a) a lattice being the reaction product of
$a_1$) a transition metal compound of formula (I)

$$L_m R_n T X_q \quad (I)$$

wherein
"T" is a transition metal of anyone of the groups 3 to 10 of the periodic table (IUPAC 2007),
each "X" is independently a monovalent σ-ligand,
each "L" is independently an organic ligand which coordinates to the transition metal (T),
"R" is a bridging group linking said organic ligands (L),
"m" is 2 or 3,
"n" is 0, 1 or 2,
"q" is 1, 2 or 3,
m+q is equal to the valency of the transition metal (T), $a_2$) a cocatalyst comprising aluminoxane
$a_3$) a compound being effective to form the lattice with the transition metal compound and/or the aluminoxane, and
(b) a hydrocarbon solvent (HS).

2. The process according to claim 1, wherein
(a) the ligands (X) are independently selected from the group consisting of hydrogen, halogen, $C_1$ to $C_{20}$ alkyl, $C_1$ to $C_{20}$ alkoxy, $C_1$ to $C_{20}$ alkenyl, to $C_{20}$ alkinyl, $C_3$ to $C_{12}$ cycloalkyl, $C_6$ to $C_{20}$ aryl, $C_6$ to $C_{20}$ aryloxy, $C_7$ to $C_{20}$ arylalkyl, $C_7$ to $C_{20}$ arylalkenyl, —SR", —PR"$_3$, —SiR"$_3$, —OSiR"$_3$ and —NR"$_2$, wherein each R" is independently hydrogen, $C_1$ to $C_{20}$ alkyl, $C_1$ to $C_{20}$ alkenyl, $C_1$ to $C_{20}$ alkinyl, $C_3$ to $C_{12}$ cycloalkyl or $C_6$ to $C_{20}$ aryl,
and/or
(b) at least one organic ligand (L), is independently selected from the group consisting of unsubstituted cyclopentadienyl ligand, substituted cyclopentadienyl ligand, unsubstituted indenyl ligand, substituted indenyl ligand, unsubstituted fluorenyl ligand and substituted fluorenyl ligand.

3. The process according to claim 1, wherein
(a) transition metal (T) is zirconium (Zr) hafnium (Hf), or titanium (Ti), and/or
(b) the bridging group(s) (R) has(have) the formula (II)

$$—Y(R')(R")— \quad (II)$$

wherein
Y is C, Si or Ge, and
R', R" are independently selected from the group consisting of $C_1$ to $C_{20}$ alkyl, $C_4$ to $C_{10}$ cycloalkyl, $C_6$ to $C_{12}$ aryl, $C_7$ to $C_{12}$ arylalkyl, and trimethylsilyl.

4. The process according to claim 1, wherein at least one organic ligand (L) comprises one or more residues independently selected from the group consisting of halogen, $C_1$ to $C_{20}$ alkyl, $C_1$ to $C_{20}$ alkenyl, $C_1$ to $C_{20}$ alkyinyl, $C_3$ to $C_{12}$ cycloalkyl, $C_5$ to $C_{20}$ cycloalkyl substituted $C_1$ to $C_{20}$ alkyl wherein the cycloalkyl residue is substituted by $C_1$ to $C_{20}$ alkyl, $C_6$ to $C_{20}$ aryl, $C_7$ to $C_{20}$ arylalkyl, $C_3$ to $C_{12}$ cycloalkyl which contains 1, 2, 3 or 4 heteroatom(s) in the ring moiety, $C_6$ to $C_{20}$ heteroaryl and $C_1$ to $C_{20}$ haloalkyl.

5. The process according to claim 1, wherein said aluminoxane $a_2$) is methylaluminoxane.

6. The process according to claim 1, wherein said compound being effective to form clathrates with the aluminoxane and/or the transition metal compound is an M-X compound, an organo-silicon compound or a halo-siloxane, said M-X compound is an organic, inorganic or organometallic compound which can potentially dissociate or partially dissociate into cationic (M) and anionic components (X).

7. The process according to claim 6, wherein the M-X compound is an organic, inorganic or organometallic compounds which can potentially dissociate or partially dissociate into cationic and anionic components and are selected from the group of alkali and alkaline earth halides or pseudohalides, an anionic hydrocarbon group, metal hydrides and alkyl, aryl and alkyl-aryl ammonium, phosphonium and sulfonium salts of halides and pseudo halides which will effectuate clathrate formation by their reactions with aluminoxane and/or the transition metal compound in hydrocarbon solvents.

8. The process according to claim 7, wherein said M-X compound is selected from the group consisting of KCl, KF, NaF, KH, LiH, KOSiR$_3$, NaBPh$_4$, Me$_4$NCl, (Octyl)$_3$NClMe, MePh$_3$, KB(C$_6$F$_5$)$_4$ and K$^+$CH$_2$Ph$^-$.

9. The process according to claim 6, wherein the organosilicon compounds which are effective in forming stable, liquid clathrates with the aluminoxane are selected from the group of hydrocarbyloxysilanes of the formula $R_3Si-O[-SiR_2-O]_n-SiR_3$ or $Si-[O-R]$ where R is, independently, a hydrocarbyl group having up to about 18 carbon atoms and n is 0 to 3; and hydrocarbylpolysiloxanes having from 2 to 6 silicon atoms in the molecule and which are separated from each other by an oxygen atom such that there is a linear, branched or cyclic backbone of alternating Si and oxygen atoms, with the remainder of the four valence bonds of each of the silicon atoms individually satisfied by a univalent hydrocarbyl group, R, as defined for the hydrocarbyloxysilanes.

10. The process according to claim 1, wherein according to a first variant A:
the liquid clathrate is obtainable by,
(i) preparing a mixture of the hydrocarbon solvent (HS), the aluminoxane and the clathrate forming compound ($a_3$),
(ii) adding to said mixture the transition metal compound of formula (I)
(iii) obtaining a two phase system, the upper phase being a hydrocarbon solvent (HS) rich phase and the lower phase being the liquid clathrate phase,
(iv) separating the lower phase being the liquid clathrate phase from upper phase being a hydrocarbon solvent (HS) rich phase
or according to a second variant B: the liquid clathrate is obtainable by,
(i) preparing a solution of the hydrocarbon solvent (HS), the aluminoxane and the transition metal compound of formula (I)
(ii) adding to said solution the clathrate forming compound ($a_3$),
(iii) obtaining a two phase system, the upper phase being a hydrocarbon solvent (HS) rich phase and the lower phase being the liquid clathrate phase, and
(iv) separating the lower phase being the liquid clathrate phase from upper phase being the hydrocarbon solvent (HS) rich phase.

11. The process according to claim 1, wherein
the hydrocarbon solvent (HS) is an aromatic hydrocarbon, and/or
the nonreactive fluorinated synthetic oil used as solvent (S) is a perfluoropolyether, a polytrichlorofluoroethylene, a fluorosilicone, or combinations thereof having a viscosity at 20° C. according to ASTM D445 of at least 10 cSt up to 2000 cSt.

12. The process according to claim 1, wherein solvent (S) is a perfluoropolyether having the formula:

$$CF_3-(CF_2)_2-O-[CF(CF_3)-CF_2-O]s-Rf \quad (I),$$

$$F[CF(CF_3)CF_2O]xCF_2CF_3 \quad (II)$$

$$CF_3O[CF_2CF(CF_3)-O-]m(CF_2-O-)n-R^1f \quad (III),$$

$$F-[(CF_2)_3-O]t-R^2f \quad (IV),$$

$$CF_3O(CF_2CF_2-O-)p(CF_2-O)qCF_3 \quad (V),$$

$$CF_3O[CF_2CF(CF_3)O]m(CF_2CF_2O)o(CF_2O)n-R^1f \quad (VI),$$

or combinations of two or more thereof; wherein
s is an integer from 2-100; Rf is $CF_2CF_3$, a C3 to C6 perfluoroalkyl group, or combinations thereof; x is an integer from 10 to 60; $R^1f$ is CF3, C2F5, C3F7, or combinations of two or more thereof; (m+n) is 8-45, inclusive; (m+n+o) is 8-45, inclusive; m/n is 20-1000, inclusive; o is >1 $R^2f$ is CF3, C2F5, or combinations thereof; t is 2-200, inclusive; (p+q) is 40-180, inclusive; and p/q is 0.5-2, inclusive, provided that the perfluoropolyether has a viscosity at 20° according to ASTM D445 of at least 10 cSt up to 2000 cSt.

13. The process according to claim 12, wherein the perfluoropolyether has the formula (I) or (II).

14. The process according to claim 13, wherein the perfluoropolyether has the formula (II).

15. The process according to claim 1, wherein the solidification is affected by evaporating the hydrocarbon solvent (HS) with an inert gas.

16. The process according to claim 10, wherein the solidification step is done in the same vessel as the emulsification step.

17. Catalyst system produced by the process comprising the steps of
I) generating an emulsion by dispersing a liquid clathrate in a solvent (S)
wherein
(i) the solvent (S) constitutes the continuous phase of the emulsion and comprises a nonreactive fluorinated synthetic oil having a viscosity at 20° C. according to ASTM D445 of at least 10 cSt up to 2000 cSt
(ii) the liquid clathrate constitutes in form of droplets the dispersed phase of the emulsion,
II) solidifying said dispersed phase to convert said droplets to solid particles, and
III) optionally recovering said particles to obtain said catalyst system,
wherein the liquid clathrate comprises
(a) a lattice being the reaction product of
$a_1$) a transition metal compound of formula (I)

$$L_mR_nTX_q \quad (I)$$

wherein
"T" is a transition metal of anyone of the groups 3 to 10 of the periodic table (IUPAC 2007),
each "X" is independently a monovalent σ-ligand,
each "L" is independently an organic ligand which coordinates to the transition metal (T),
"R" is a bridging group linking said organic ligands (L),
"m" is 2 or 3,
"n" is 0, 1 or 2,
"q" is 1, 2 or 3,
m+q is equal to the valency of the transition metal (T),
$a_2$) a cocatalyst comprising aluminoxane
$a_3$) a compound being effective to form the lattice with the transition metal compound and/or the aluminoxane, and
(b) a hydrocarbon solvent (HS).

18. Catalyst system according to claim 17, wherein the catalyst system is used in polypropylene polymerization for the preparation of a solid olefin polymerisation catalyst system.

19. Catalyst system according to claim 17, wherein a perfluoropolyether is used as solvent (S) for forming the continuous phase of an emulsion in combination with a compound being effective to form clathrates with aluminoxane and or the transition metal compound of formula (I), said perfluoropolyether having the formula:

$$CF_3-(CF_2)_2-O-[CF(CF_3)-CF_2-O]s-Rf \quad (I),$$

$$F[CF(CF_3)CF_2O]xCF_2CF_3 \quad (II)$$

$$CF_3O[CF_2CF(CF_3)-O-]m(CF_2-O-)n-R^1f \quad \text{(III)},$$

$$F-[(CF_2)_3-O]t-R^2f \quad \text{(IV)},$$

$$CF_3O(CF_2CF_2-O-)p(CF_2-O)qCF_3 \quad \text{(V)},$$

$$CF_3O[CF_2CF(CF_3)O]m(CF_2CF_2O)o(CF_2O)n-R^1f \quad \text{(VI)},$$

or combinations of two or more thereof; wherein
s is an integer from 2-100; Rf is CF2CF3, a C3 to C6 perfluoroalkyl group, or combinations thereof; x is an integer from 10 to 60; $R^1f$ is CF3, C2F5, C3F7, or combinations of two or more thereof; (m+n) is 8-45, inclusive; (m+n+o) is 8-45, inclusive; m/n is 20-1000, inclusive; o is >1$R^2f$ is CF3, C2F5, or combinations thereof; t is 2-200, inclusive; (p+q) is 40-180, inclusive; and p/q is 0.5-2, inclusive, provided that the perfluoropolyether has a viscosity at 20° according to ASTM D445 of at least 10 cSt up to 2000 cSt.

20. The process according to claim 1, wherein "T" is titanium (Ti), zirconium (Zr) or hafnium (Hf).

* * * * *

UNITED STATES PATENT AND TRADEMARK OFFICE
CERTIFICATE OF CORRECTION

PATENT NO. : 8,822,365 B2  
APPLICATION NO. : 13/643898  
DATED : September 2, 2014  
INVENTOR(S) : Jenni Valonen et al.

Page 1 of 1

It is certified that error appears in the above-identified patent and that said Letters Patent is hereby corrected as shown below:

In the Specification

Column 8,  
Line 31, "acyclic" should be --cyclic--.

Column 9,  
Line 1, insert --be-- between "may" and "a".

Column 9,  
Line 10, remove --is-- between "of" and "$C_1$".

Column 12,  
Line 17, remove --a-- between "more" and "metallocenes".

Column 15,  
Line 31, "$CF_3O(CF_2CF_2\text{-}O\text{-})p(CF_2\text{-}O\text{-})qCF_3$" should be --$CF_3O(CF_2CF_2\text{-}O\text{-})p(CF_2\text{-}O)qCF_3$--.

Column 19,  
Line 61, "$x_{1\text{-}1}$" should be --$x_{i\text{-}1}$--.

In the Claims

Column 21,  
Line 58, "6-ligand" should be --σ-ligand--.

Signed and Sealed this  
Fifteenth Day of September, 2015

Michelle K. Lee  
*Director of the United States Patent and Trademark Office*